May 30, 1933.  H. ROSENBERG  1,912,222
FASTENER
Filed April 29, 1930
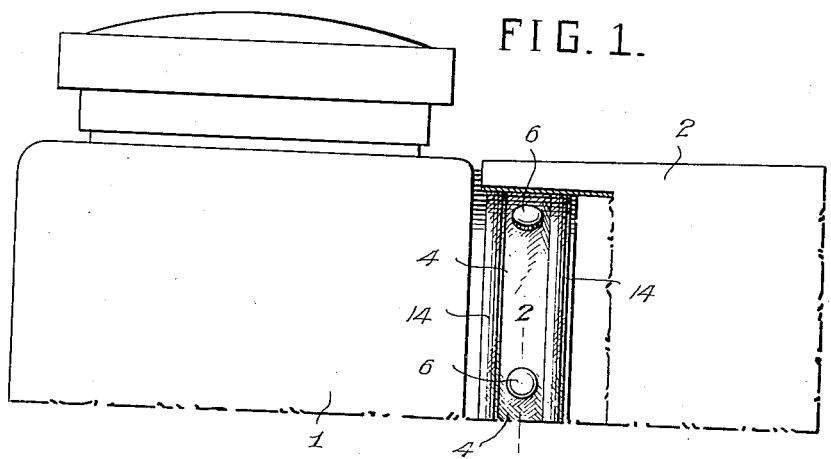
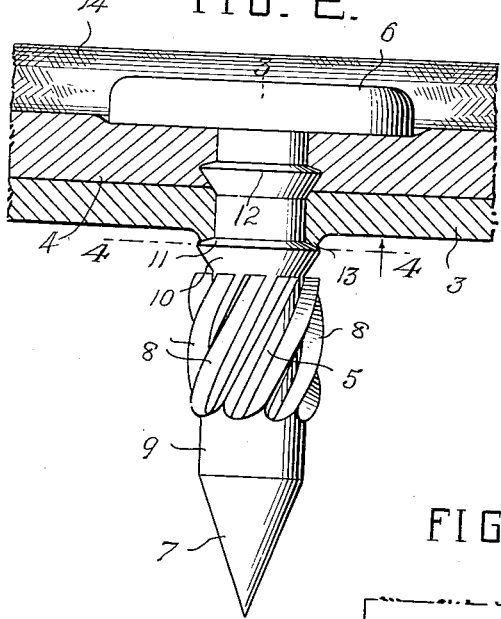
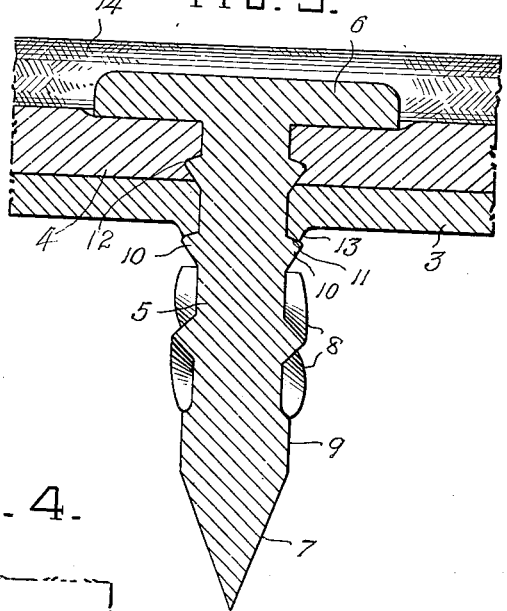
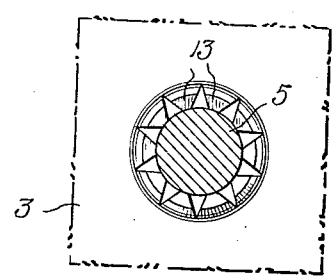
Inventor
HEYMAN ROSENBERG
By Edgar M Kitchin
his Attorney Patented May 30, 1933

1,912,222

UNITED STATES PATENT OFFICE

HEYMAN ROSENBERG, OF NEW YORK, N. Y.

FASTENER

Application filed April 29, 1930. Serial No. 448,350.

This invention relates to improvements in anchoring devices, and more particularly to such as are adapted for penetration of a plurality of sheets for fastening the sheets together.

The essential object in view is the combining of inexpensiveness with efficiency and relative permanence in the fastening of parts.

A more detailed object is the formation of a fastener with such details of construction as to cause a portion of the fastener to prepare the work to be fastened to cooperate with other portions of the fastener to lock the work in a fastened condition.

In greater detail, a further object is the provision of simple, inexpensive and efficient means for easily and quickly anchoring a pliable sheet, such as fabric, to a metallic sheet.

With these and other objects in view as will in part hereinafter become apparent and in part be stated, the invention comprises certain improvements in the art of anchorage including both an anchorage device or fastener of special construction and the preferred mode of use and treatment of work incident to use of such fastener.

In greater detail, that phase of the invention relating to the fastener itself includes a body adapted to penetrate work, means on the body for forming a detent in the work, and interlocking means on the body for interlocking with the detent to secure the fastener in position for locking the work fastened together.

The invention also comprises a pin-like body adapted to penetrate a sheet of metal work and having outstanding parts designed and adapted to divide marginal portions of the work surrounding the pin after penetration of the work into detent projections, and a shoulder on said pin adapted to be engaged by said detent projections for locking the pin in its engagement with the work.

In further detail, the invention comprises the structure last set forth in which the outstanding parts are rib-like in formation and outstand to a greater distance than the outstanding of the shoulder.

The invention also comprises the art of anchoring together two sheets of work, one of which is metal, by penetrating the sheets with a pin, forming detents about the periphery of the opening occasioned by penetration of one of the sheets, and interposing a lock for the pin in position for being engaged by said detents to resist retractile movement of the pin.

Fabric, such as leather or woven fiber, or like pliable material, requires anchorage to metal, such as sheets and plates of metal, as, for example, the lining of brakes to brake bands, the anti-squeak strips to the hood-receiving portions or offset shoulders of automobile structures, and other like places where relative movement between contacting pieces of metal would be objectionable for various causes, and form of cushions (usually fabric or rubber) are accordingly interposed, or in other places where a liner or cover of fabric for metal is desirable. An essential object of the present invention is easy and dependable connection of such fabric to the metal in all such instances. The particular adaptation of the invention has been selectively illustrated in the accompanying drawing as applied to the anti-squeak strips of automobiles, but this obviously is only one of numerous uses to which the invention may well be put.

However, for facility of disclosure, reference is had to the specific illustration in the accompanying drawing in which 1 indicates the radiator and 2 the hood of an ordinary automobile, the radiator having the usual offset portion of sheet metal 3 to which is secured the anti-squeak strip 4, which strip is engaged by the inner surface of the hood 2. The fabric 4 and sheet metal 3 are illustrated as connected by the practicing of the present invention in the use of the present improved fastener, which latter is illustrated in the form of a preferred embodiment having a pin-like body 5 preferably headed at one end, as at 6, and at its opposite end preferably provided with an entering or penetrating point 7. The head 6 is susceptible of a wide range of variation, and the point 7 may in certain circumstances be entirely omitted. Since the structure is illustrated in the drawing as if it had been driven downward into place, the point or entering end will, for convenience, be considered the lower portion and the head the upper portion of the pin with the reservation that, of course, the pin may be changed to any location desired, and the terms will vary in significance accordingly while being equally applicable to the structure.

The body 5 is formed with a series of outstanding ribs 8 which are thread-like in formation, but preferably of especially high pitch, and may be made sufficiently high to be substantially parallel with the longitudinal axis of the pin. The threads or ribs 8 correspond largely in formation and location to those shown in my United States Letters Patent No. 1,482,151, dated January 29th, 1924. From Figure 3 it will be observed that the ribs or threads 8 have their valleys of a depth which may be identified by the commercially accepted term "root diameter" of the pin, by which, in fact, is meant the actual pin body measured at its narrowest diameter. The ribs 8 while capable of being reduced to a minimum are preferably in a number sufficient to provide valleys therebetween equal in area approximately to the cross sectional area of any one rib, but it should be borne in mind that this is only a commercial preference, and variations in the width of said valleys, in the number of ribs, in their pitch, and in the relative size of rib with respect to valley may be extended practically without restriction to the limits of utility within the intent, purpose, and scope of the invention. Below the lower ends of the ribs 8, the body 5 is provided with a pilot 9 which consists of a smooth, cylindrical portion between the beginning of the taper forming the point or tip 7 and extending upward and terminating with the lower ends of the ribs. It will be observed particularly from Figure 3 that the pilot 9 is of greater diameter than the main portion of the pin 5, and, therefore, outstands therefrom, but the diameter of the pilot 9 is not as great as the distance from diametrically opposite points of the outstanding edges of diametrically opposed ribs 8, so that each rib outstands beyond the extended line of the adjacent portion of the pilot 9. Thus, each rib 8 extends in its width or outstanding thickness from a base inward of the surface or pilot 9 to an apex outward beyond such surface.

Immediately above the upper ends of the ribs 8, a ring or peripheral ridge 10 is formed integral with and outstands from the body 5, but the greatest diameter of the ring 10 is less than the distance from the apex of one rib 8 to the apex of a diametrically opposite rib 8, so that the edges of the ribs outstand from the body an appreciably greater distance than the ring 10. The upper face of ring 10 provides a shoulder 11, which is preferably substantially abrupt, while the lower face of the ring presents a downwardly-tapering or conical portion contributing to the ease with which the parts cooperate, as will become apparent hereinafter in the description of the operation.

Spaced upwardly in the length of body 5 from the ring 10, a second, similar ring 12 is provided and presents a peripheral ridge encircling the body 11 and spaced from ring 10 a distance to leave an annular groove between the two beads proportioned approximately to accommodate the anchor sheet or metal sheet 3 to which the other work is to be connected. The ring or circumferential bead 12 is preferably spaced below the head 6 a distance to accommodate most, and in some instances all, of the thickness of the fiber sheet 4.

The ribs 8 and the peripheral ridge or ring 10 are hardened sufficiently for entering metal, such as soft iron and soft steel, substantially without injury to said ribs and ridge, and, as a matter of practical, commercial production, the pin 5 and all its parts are formed of iron or steel, or other appropriate metal, and case-hardened to provide the required functional capacity of said ribs 8 and ridge 10, and, when the structure is case-hardened, of course, the ridge 12, head 6, penetrating tip 7, pilot 9, and other surface parts are hardened, though such hardness is not actually required for the successful functioning of the device. Hardening of the entering tip or point 7 contributes somewhat to the ease with which the fastener is applied, but is not an absolutely necessary pre-requisite.

In practicing the preferred mode of use and the preferred art of anchoring pliable sheet material to sheet metal, the pliable material is placed upon the metal, the pin is applied with its point against the pliable sheet, and the head 6 is pressed for forcing the pin axially inward to a seated position with the head engaging the outer surface and sometimes compressing the pliable material. This axial thrust may be accomplished by the application of power in any of various ways, one simple and efficient expediency consisting of delivering a hammer blow on head 6. Whatever the method of applying the power, when the pin is forced axially through the work to be anchored together, point 7 first penetrates the pliable material or fiber sheet, and then penetrates the sheet metal, and the pilot 9 tends to smooth off the boss or burr formed by the penetration of the metal sheet, and then the margins of the material surrounding the opening formed by the penetrating tip 7 and pilot 9 are entered by the ribs 8 and severed at various places, as clearly shown in Figure 4, producing a series of tooth-like detents 13, 13, spaced apart by the action of the ribs. The action of the ribs also, in addition to serving the metal they enter, causes a certain amount of cold flow of the metal tending to cause the marginal portions of the metal sheet surrounding the opening formed by the tip 7 and pilot 9 to tend to fill up, and in many instances to entirely fill up the valleys between the ribs. This, of course, must be understood to be a progressive process, because the formation of the detents 13 has no sooner occurred by the action of the ribs 8 than the pin is moved on until the tooth-like detents 13 strike the inclined under face of peripheral, circular ridge 10, and by the further advance of the pin are caused to ride over that ridge, whereupon they spring or snap back into engagement with the upper face or shoulder 11 of the ridge 10. As there are no openings in the ridge 10 corresponding to the valleys between ribs 8, and, in fact, no openings of any kind, the detents 13 cannot possibly find their way back, and the pin is thus effectively locked against longitudinal retrograde movement. The seated position of the several detents 13 against surface 11 insures anchorage not only of the pin in place but of the fabric 4 to the plate or sheet 3. The peripheral ridge 12 serves to limit the downward or inward movement of the pin by engaging the outer surface of the plate 3, and this aids in bringing the pin to a standstill in spite of any unexpended, axially-delivered pressure, so that the head 6 in engaging the fabric 4 will not unduly or injuriously compress the fabric while compressing the same sufficiently to insure effective anchorage and guarantee retention of the fabric against relative movement with respect to sheet or plate 3.

It will be observed that the reduced extent to which the peripheral ridge 10 outstands relative to the extent to which the ribs 8 outstand enables in operation the detent prongs 13 to have a certain portion between the openings formed by the ribs 8 at the base of the respective portions 13 radially outward out of contact with ridge 10 as the ridge passes through the opening surrounded by the detents 13 and first spreads, and then allows contraction thereof. Tearing or other injury of the sheet 3 or excess spreading of the prongs or detents 13 to a place where they will not return is completely avoided by the reduced diameter or less outstanding distance of the peripheral rib 10 than the outstanding of the ribs 8, and the return of the free end portions of the detents or prongs 13 to a snugly seated relation against the body 5 between the ridges 10 and 12 is assured.

It will be observed, of course, that usually exposure of head 6 to contact with outer portions of work or cooperating devices is liable to be undesirable, and to avoid any such occurrence, any of the well known expediencies may be employed for causing the head to be set inward beyond the most exposed portions of the material 4. In antisqueak construction, it is a common practice to provide marginal beads 14, 14, outstanding an appreciable distance beyond the outer face of head 6, so that the hood 2 rests against the marginal beads 14 and has no opportunity to contact with the fastener heads.

Slight irregularities and variations are, of course, liable to occur in work and the results obtained by the practical use of the present improved fastener, and, accordingly, the showing in Figures 2, 3, and 4 of the drawing must be understood to be idealized as if the parts had functioned practically perfectly. In practice, the actual operation is liable to vary somewhat, and even to vary slightly as between any two fasteners in adjacent portions of the same work. For instance, while prongs or detents 13 might sometimes be formed to be exactly the right length and possessed of the exact resiliency to cause them to all spring back to the position snugly engaging the body 5, and the upper surface of ring 10, as seen in Figures 2 and 3, slight departures will ordinarily, regularly occur. Thus, the formation of a jagged burr by the penetration of sheet 3 is almost certain to happen with each operation, and thus, when the sheet is divided by ribs 8 into serrations or prongs 13, each is liable to differ slightly in length from that of all the others, and some may even be long enough to slightly lap the under face of ring 10 when the parts are seated. Again, in practice, not all of the prongs 13 are likely to spring back all the way to contact with the pin body 5, but some of the prongs will do so and enough will be of proper length and have proper return movement to effectively engage the upper surface of the ring 10 and thus assure in practice an effective interlock with shoulder 11. A very simple, inexpensive, easily-applied, and dependable anchorage is thus obtained by the employment of the present improved fastener, and variations from the idealized showing in the accompanying drawing will not measurably or substantially detract from the dependable and efficient functioning of the fastener.

The appended claims are directed to subject matter not disclosed in my co-pending applications identified as follows: Serial No. 688,423, filed January 25, 1924; Serial No. 461,761, filed June 17, 1930; Serial No. 662,793, filed March 25, 1933; the latter two being respectively in part a continuation of and a division of my co-pending application Serial No. 282,732, filed June 4, 1928, now Patent No. 1,844,823, dated February 9, 1932, in which co-pending applications are claimed broadly and specifically features of invention corresponding to unclaimed features of invention illustrated and disclosed but not claimed herein.

What is claimed is:—

1. A fastener comprising a pin-like body, prong-forming means outstanding from the body and proportioned and located to produce generally centering or inwardly-extending prongs in work penetrated by the prong-forming means, and a detent shoulder on the body outstanding from the body beyond the prong-forming means and located in the length of the body relative to the prong-forming means such as to cause the shoulder to pass prongs formed in work by the prong-forming means when the body is driven through work, such as sheet metal.

2. A fastener as claimed in claim 1 wherein the prong-forming means comprise projections from the sides of the body intermediate the ends of the body spaced to produce a plurality of substantially uniformly spaced prongs and the shoulder is circumferential and uninterrupted.

3. A fastener as claimed in claim 1 wherein the prong-forming means comprises a plurality of ribs extending along the body.

4. A fastener comprising a pin-like body, prong-forming means outstanding from the body and proportioned and located to produce generally inwardly-extending prongs in work penetrated by the prong-forming means, and a detent shoulder on the body beyond the prong-forming means, the prong-forming means comprising a plurality of ribs and the ribs outstanding from the body a greater distance than the shoulder and the shoulder being circumferential and uninterrupted, and the pin being provided with a second similar shoulder spaced axially of the pin body from the first.

5. A fastener adapted for use in metal work comprising a headed, pin-like body having outstanding ribs extending generally in the direction of the length of the body, and a circumferential ridge encircling the body adjacent the ends of the ribs and outstanding from the body a less distance than the ribs and having a shoulder facing toward the ribs.

6. A fastener comprising a headed, pin-like body having a penetrating tip, a pilot portion above the tip, ribs outstanding from the body next the pilot portion and extending in general longitudinally of the pin, and a circumferential ridge outstanding from the body above the ribs.

7. A fastener as claimed in claim 6 wherein the body is formed with a second circumferential ridge spaced above the first.

8. In the art of anchorage in a sheet of metal, treating work positioned in its final location comprising slitting a metal sheet and thereby forming prongs, and passing an instrument into position first springing the prongs apart and then permitting return movement thereof and thus establishing an interlock between portions of said instrument and said prongs.

9. A fastener comprising a headed, pin-like body having a pilot portion, ribs outstanding from the body next the pilot portion and extending in general longitudinally of the pin, and a circumferential ridge outstanding from the body above the ribs, the greatest diameter of the circumferential ridge being greater than the diameter of the pilot portion and less than the distance between the free edges of diametrically opposite ribs.

10. A hammer-driven fastener comprising a penetrating instrument having a penetrating entering point, having sheet-material-slitting means, and having means more remote from the entering point of the instrument than the slitting means for establishing an interlock of the instrument with the projections of slitted material while slitted and incident to the slitted condition of the material.

11. A fastener comprising a pin-like body, prong-forming means outstanding from the body and proportioned and located to produce generally inwardly-extending prongs in work penetrated by the prong-forming means, and a detent shoulder on the body spaced outwardly thereof beyond the prong-forming means and outstanding from the body a less distance than that of the prong-forming means, the shoulder having uninterrupted portions in line with the space between the prong-forming means so as to be in line with formed prongs.

In testimony whereof I affix my signature.

HEYMAN ROSENBERG.